May 6, 1947.    L. D. THOSTENSON    2,420,110
BRAKE CONTROL MECHANISM
Original Filed April 13, 1943    2 Sheets-Sheet 1

Inventor
LEWIS D. THOSTENSON
HARRIS, KIECH, FOSTER & HARRIS
By F. W. Harris
FOR THE FIRM
Attorneys

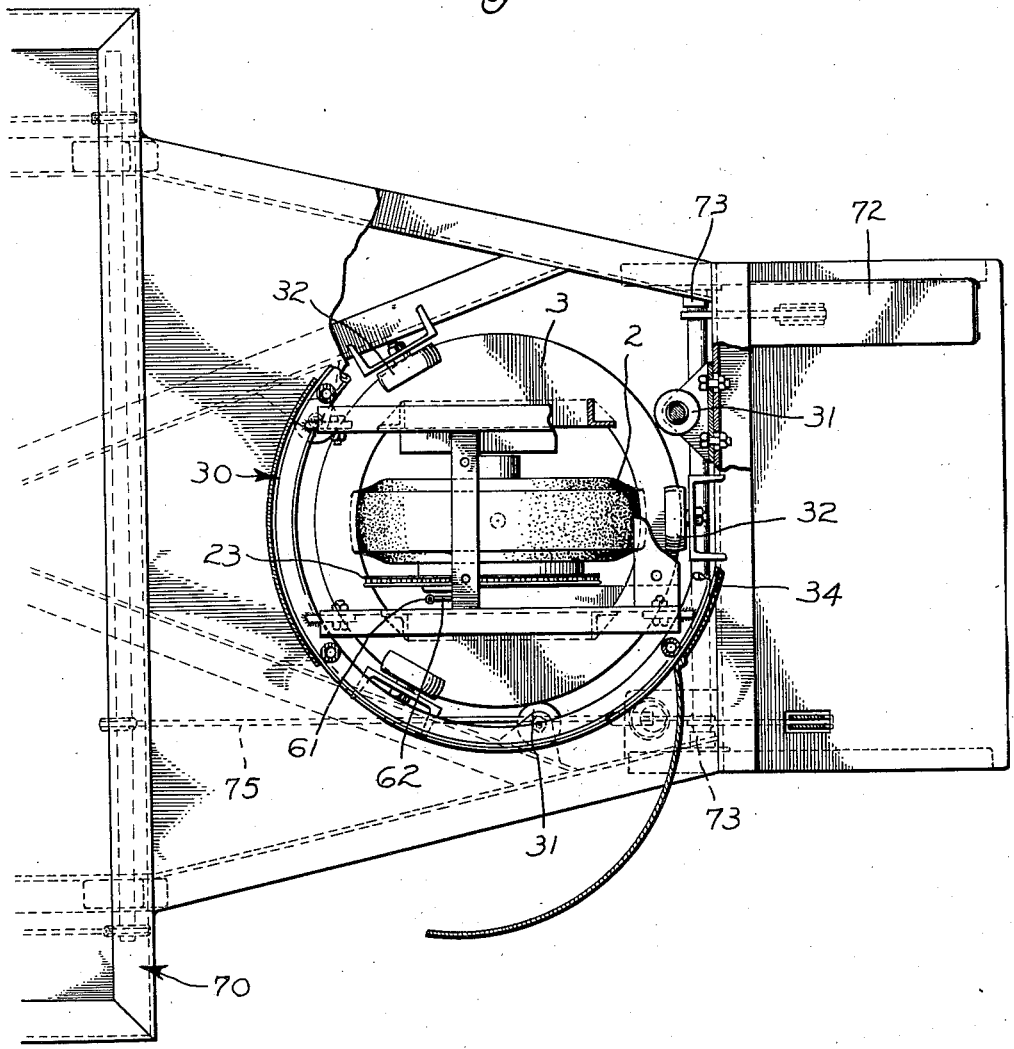

Patented May 6, 1947

2,420,110

UNITED STATES PATENT OFFICE 2,420,110

BRAKE CONTROL MECHANISM

Lewis D. Thostenson, Inglewood, Calif., assignor to Salsbury Corporation, Los Angeles, Calif., a corporation of California Original application April 13, 1943, Serial No. 482,865. Divided and this application May 28, 1945, Serial No. 596,237

6 Claims. (Cl. 180—77)

This application is a division of my copending application, Serial No. 482,865, filed April 13, 1943, entitled "Turret truck."

My invention relates to industrial trucks such as those used to transport moderate loads over comparatively short distances, as, for example, from one location in a warehouse or factory to another. An object of the invention is to provide such a truck which has great maneuverability so that it can be used in places crowded with merchandise, machine parts, or other materials.

A further object is to provide such a truck which may be driven and controlled with great facility.

Further objects and advantages will be made evident hereinafter.

In the drawings, which are for illustrative purposes only,

Fig. 2 is a plan of the lower portion of the turret with some of the upper parts omitted;

Figure 1:
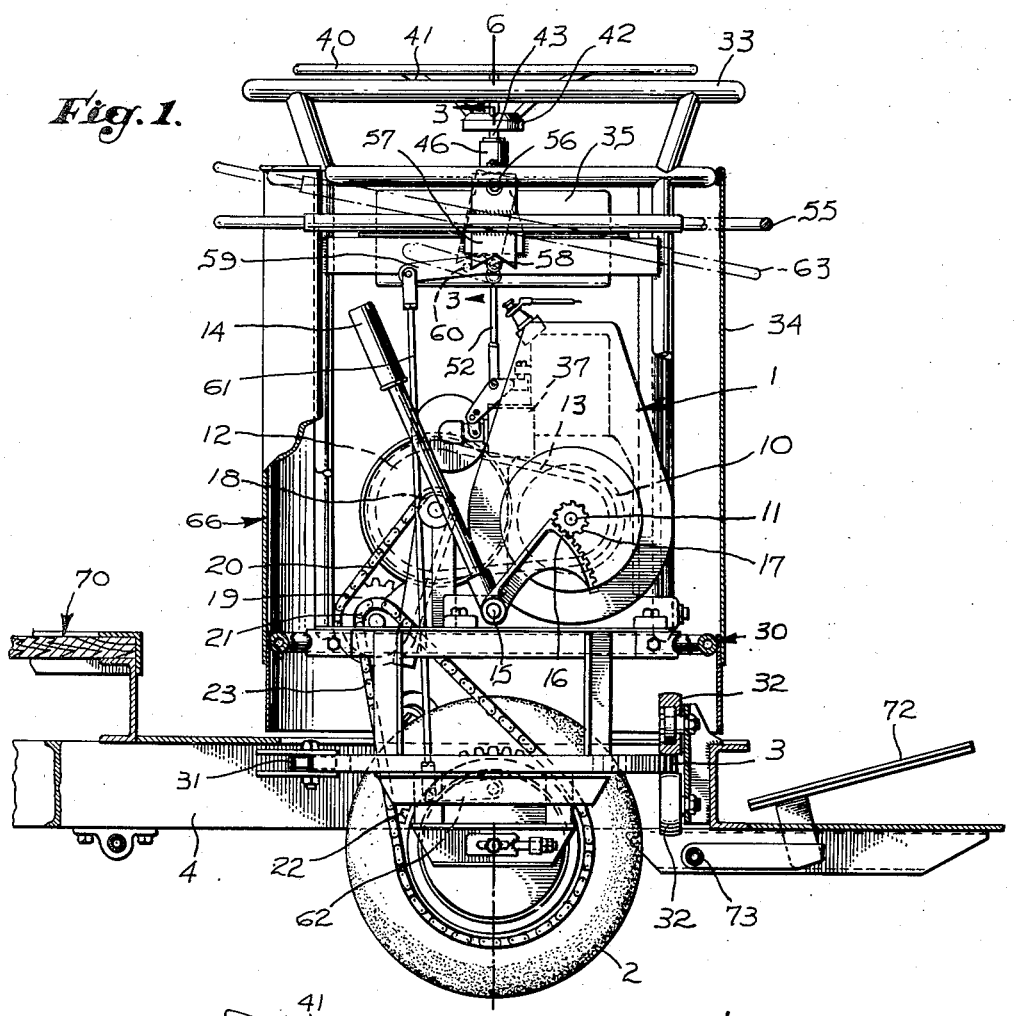
Fig. 1 is an elevation, partly in section, through the turret containing the driving mechanism.
Figure 3:
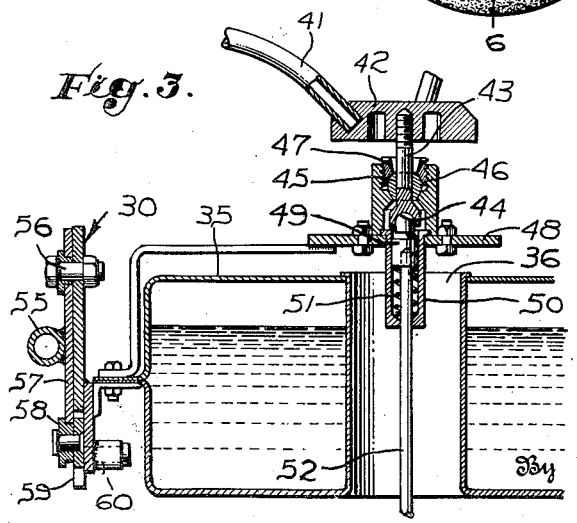
Fig. 3 is a vertical section through the gas tank and gas control mechanism.

In all forms of trucks, a driving mechanism such as that shown in Figs. 1 and 2, and details of which are shown in Fig. 3, is used. This driving mechanism includes an internal combustion engine 1, which drives a driving wheel 2 through suitable mechanism. The driving mechanism is carried on a circular ring 3 which is free to rotate inside a frame 4. The entire engine with its fuel tank and all controls is carried on the ring 3 so that the driving mechanism can turn freely about an axis 6—6 which is perpendicular to the surface upon which the truck runs, so that the driving mechanism can push or pull the frame 4 in any direction at right angles to the axis 6—6. The direction of pull may be changed by turning the driving mechanism about the axis 6—6, so that without reversing the direction of rotation of the engine the frame 4 can be pulled forward or backward or in any other horizontal direction.

The transmission mechanism which is shown consists of a driving pulley 10 on the engine shaft 11, the driving pulley 10 driving a driven pulley 12 through a V-belt 13. This transmission is similar to that shown in Patent No. 2,260,798, issued on October 28, 1941, to Bruce Burns, and contains an automatic clutch as described in said patent which is disconnected as long as the engine is running at idling, or below a certain critical speed, but which automatically engages so that the shaft 11 drives the pulley 10 only above this critical speed. A starting lever 14 pivoted at 15 and carrying a gear 16 which engages a pinion 17 on the engine shaft 11 is used to start the internal combustion engine 1. The pinion 17 has a ratchet clutch, so that after the engine is started by the pinion 17 the engine can rotate freely without driving the pinion 17. Such starting devices for internal combustion engines are in common use, and many internal combustion engines now on the market include such a starter. The pulleys 10 and 12 are of variable diameter, as explained in said Patent No. 2,260,798, and these diameters are varied automatically, the diameter of the pulley 10 being increased and the diameter of the pulley 12 being decreased as the rotative speed of the wheel 2 and the surface speed of the truck increase, and vice versa. Thus, when the truck is moving at slow speeds, the transmission being in what is commonly called "low gear," the engine 1 may turn 4N times as fast as the wheel 2, but as the vehicle speeds up, the pulley ratio changes gradually until the engine only turns N times as fast as the wheel 2. The transmission is then in high gear. This transmission is not my invention, is now in common use, and those who are interested in its construction or method of operation are respectfully referred to the above patent. The pulley 12 drives a sprocket 18 which drives a sprocket 19 through a chain 20, and the sprocket 19 drives a sprocket 21 which drives a sprocket 22 through a chain 23, the sprocket 22 being connected to the driving wheel 2.

All of the above mechanism is mounted on a suitable structure 30 which is rigidly mounted on the circular member 3. This circular member 3 is guided horizontally by a plurality of small wheels 31 and vertically by small wheels 32 journalled in the frame 4 so that the circular member 3 and the above described mechanism can be freely turned in the frame 4 about the axis 6—6. The wheels 31 and 32 are merely friction reducing members, and, obviously, other mechanically equivalent means may be substituted for them. The wheel 2 is journalled to the structure 30 and turns with it. Rigidly secured to the structure 30 is a tubular handwheel 33 by means of which the structure 30 may be turned about the axis 6—6 by the truck driver. A sheet-iron casing 34 surrounds the engine and mechanism and is secured to the structure 30 and turns with it. It will be obvious that the entire driving mechanism including the engine 1 and the wheel 2 may be turned by the handwheel 33 so that the wheel 2 pulls the end of the frame in any direction about the axis 6—6.

The above described combination constitutes the subject-matter of my copending application of Serial No. 482,865, from which this application is divided.

Mounted above the engine 1 on the structure 30 is a gas tank 35, shown in Fig. 3, which is annular in shape, having a cylinder defining a central opening 36 extending therethrough. Gasoline from the tank 35 is delivered by gravity to a carburetor 37 mounted on and feeding fuel to the engine 1. A novel arrangement of parts is provided by means of which the truck driver may control the carburetor 37 to regulate the feed of fuel to the engine 1. A light-weight gas control ring 40 is provided which is mounted above and slightly inside the handwheel 33, where it can be readily reached by the fingers of the driver when he is grasping any part of the handwheel 33. When the ring 40 is parallel to the handwheel 33, the carburetor 37 is set to feed only enough gasoline to the engine 1 to enable the engine to run slightly below the critical speed at which the centrifugal clutch, not shown but included in the transmission, engages. If the ring 40 is pushed down, the amount of fuel fed to the engine is increased. The mechanism by which this is accomplished is shown in Fig. 1 and Fig. 3.

The ring 40 is carried by spokes 41 on a hub 42. Threaded in the hub 42 is a pin 43 having a concavity 44 at its lower end. The pin is carried in a ball 45 secured in a member 46 by a nut 47, the member 46 being rigidly secured to a plate 48 which is a part of the structure 30. The concavity 44 engages the end of a plunger 49 which can move vertically in a tube 50 which is also secured to the structure 30. A compression spring 51 holds the pin in its upper position, as shown in Fig. 3. If the ring 40 is pushed down, the ring and the spokes 41, the hub 42, and the pin 43 turn about a point central in the ball 45. The plunger 49 is connected to the carburetor by a rod 52 in such a manner that when this rod is forced downwardly, the supply of fuel to the engine is increased, and it is so forced downwardly when the ring 40 is tilted from a position parallel to the handwheel 33.

The above described throttle control structure constitutes the subject-matter of my copending application of Serial No. 596,238, filed May 28, 1945.

It is convenient to provide a hand brake on the wheel 2 so that the operator can brake this wheel and prevent it from pulling on the frame 4. For this purpose I provide a brake ring 55 acting as a brake lever which may be pivoted as shown at 56 on the structure 30, so that it can turn about an axis parallel to the axis of the wheel 2. Mounted on the brake ring 55 is a notched plate 57 which engages a roller 58 carried on a lever 59 which is pivoted on the structure 30 at 60. The other end of this lever 59 is connected to a brake pull rod 61 which is connected to a brake lever 62 by which the brake, not shown, is actuated. The brake may be internal-expanding, or any other well known form of brake. When the brake ring 55 is either pushed down or pulled up into the position shown at 63 in Fig. 1, the notched plate 57 pushes the roller 58 down and thus applies the brake.

A truck driver may stand on a platform in front of the turret 66 consisting of the structure 30 and the parts carried thereby. He starts the engine by means of the lever 14, and the engine then runs below the critical speed, so that the centrifugal clutch is not engaged and no driving force is applied to the wheel 2. He then grasps the handwheel 33 and turns the turret 66 so that the wheel 2 will push or pull the frame 4 in whatever direction he wishes to go. If he then pushes down on the gas control ring 40, the supply of gasoline fed to the engine 1 by the carburetor 37 is increased, the engine speeds up and the centrifugal clutch engages so that the wheel 2 is energized, and the truck starts. The driver can turn the turret 66 so that the frame is pulled in any direction about the axis 6—6. When he wishes to stop, he releases the gas control ring 40 and pulls upwardly or pushes downwardly on the brake ring 55 to apply the brake.

Such a driving turret may be applied to many forms of truck bodies, such as that shown at 70 in the drawings, this body being supplied with two rear wheels. A foot brake operating on one or both rear wheels may be operated by either of two pedals 72. The pedal 72 is pivoted on the frame 4, as shown at 73, and is held in its upper position by a compression spring, not shown. When the pedal 72 is depressed, the brakes on the rear wheels, which may be of any well known type, are released by a push rod 75.

The principal advantage of this type of truck is that the wheel 2 can pull or push the body in any direction, which is determined by the position of the turret 66. The operator, by using the handwheel 33, can turn the turret in any direction or from any position to any other position, since the mechanism inside the turret is entirely self-contained and not connected except through the wheels 31 and 32 with the remainder of the truck.

The automatically shifting power transmission enables the truck to start heavy loads and pull such loads up ramps in low gear, and the gear shifts toward high when the truck is rolling, the gear ratio gradually changing automatically up or down to suit changing load conditions. The truck thus has an automatic transmission, and no gear shift lever or other operator-controlled mechanism is necessary. The centrifugal clutch does away with a clutch pedal or other operator-controlled mechanism. When the gas control ring 40 is depressed, the engine speeds up, the clutch engages, and the truck starts. When pressure on the ring 40 is released, the gas is shut off, and as the truck and engine slow down, the clutch releases and the engine idles. Especially important is the fact that steering by the handwheel 33, gas control by the ring 40, and braking by the lever 55 are readily accessible to the driver 65, whatever his position with relation to the turret 66.

The notched plate 57 applies the brake if it is rotated in either direction about the pivot 56 from its full position, as shown in full lines in Fig. 1. In other words, the front wheel brake is applied by pushing the brake ring 55 down into the position 63 or pulling it upwardly from its central position. This is an advantage as when the driver has his foot on the pedal 72, or is standing, he can exert force upwardly more conveniently than downwardly. Obviously, the driver need not stand, and in some embodiments of the invention a seat may be provided for him on the body. For short haul industrial purposes, a standing position is most advantageous, as the driver can get on and off quickly and can move and turn around easily to see where he is going.

I claim as my invention:

1. In a truck, having a body and a turret turning freely about a vertical axis, said turret being supported on a wheel rotating about a horizontal axis fixed in said turret, the combination of: a brake for said wheel; a brake operating ring encircling the turret and pivoted about a horizontal axis fixed with relation to said turret; and means by which rotation of said brake ring about said axis either way from neutral position applies said brake.

2. In a truck, having a body and a turret turning freely about a vertical axis, said turret being supported on a wheel rotating about a horizontal axis fixed in said turret, the combination of: a brake for said wheel; a brake operating ring movably mounted on and encircling the turret in such a position as to be readily grasped by the hand of an operator; and means by which movement of said ring by the operator actuates said brake.

3. In a truck, having a body and a turret turning freely about a vertical axis, said turret being supported on a wheel rotating about a horizontal axis fixed in said turret, the combination of: a brake for said wheel; a brake operating ring encircling the turret and pivoted about a horizontal axis fixed with relation to said turret; and means by which rotation of said brake operating ring about said axis from neutral position applies said brake.

4. In a vehicle of the type described, the combination of: a driving wheel; a structure in which the aforesaid parts are mounted and carried; a body upon which an operator may be carried; means for so mounting said structure in said body that the structure may be turned in said body about a vertical axis; a brake for said wheel; a brake pull rod by which said brake may be operated, said pull rod extending upwardly and being carried by said structure; means by which said brake is applied whenever tension is exerted on said brake rod; a brake control lever pivoted about a horizontal axis fixed in relation to such structure; and means by which rotation of said lever about said axis in either direction exerts tension on said brake rod.

5. In a vehicle of the type described, the combination of: a driving wheel; a structure in which the aforesaid parts are mounted and carried; a body upon which an operator may be carried; means for so mounting said structure in said body that the structure may be turned in said body about a vertical axis; a brake for said wheel; a brake pull rod by which said brake may be operated, said pull rod extending upwardly and being carried by said structure; means by which said brake is applied whenever tension is exerted on said pull rod; an operating lever turning about a horizontal axis fixed with relation to said structure, the upper end of said pull rod being secured to said operating lever; a brake control lever pivoted on a horizontal axis fixed with relation to said structure; and means by which said brake control lever exerts tension on said pull rod through said operating lever.

6. In a vehicle of the type described, a combination of: a driving wheel; a structure in which the aforesaid parts are mounted and carried; a body upon which an operator may be carried; means for so mounting said structure in said body that the structure may be turned in said body about a vertical axis; a brake for said wheel; a brake pull rod by which said brake may be operated, said pull rod extending upwardly and being carried by said structure; means by which said brake is applied whenever tension is exerted on said pull rod; an operating lever turning about a horizontal axis fixed with relation to said structure, the upper end of said pull rod being secured to said operating lever; a brake control lever pivoted on a horizontal axis fixed with relation to said structure and surrounding said structure so that it is accessible to the operator in all angular positions of said structure; and means by which said brake control lever exerts tension on said pull rod through said operating lever.

LEWIS D. THOSTENSON.

REFERENCES CITED

The following references are of record in the file of this patent:

UNITED STATES PATENTS

| Number | Name | Date |
|---|---|---|
| 1,663,299 | Grist | Mar. 20, 1928 |
| 1,346,914 | Sauvage | July 20, 1920 |
| 2,260,798 | Burns | Oct. 28, 1941 |

FOREIGN PATENTS

| Number | Country | Date |
|---|---|---|
| 725,871 | French | Feb. 22, 1932 |